(12) United States Patent
Shirin et al.

(10) Patent No.: US 7,937,406 B2
(45) Date of Patent: May 3, 2011

(54) MECHANISM FOR AUTOMATICALLY ESTABLISHING A RESOURCE GRID

(75) Inventors: Gregory Shirin, San Jose, CA (US); Daniel M. Fraser, Naperville, IL (US); Charu V. Chaubal, Burlingame, CA (US); Wolfgang G. Gentzsch, Los Altos, CA (US)

(73) Assignee: Oracle America, Inc., Redwood City, CA (US)

( * ) Notice: Subject to any disclaimer, the term of this patent is extended or adjusted under 35 U.S.C. 154(b) by 524 days.

(21) Appl. No.: 10/662,020

(22) Filed: Sep. 11, 2003

(65) Prior Publication Data

US 2005/0060349 A1 Mar. 17, 2005

(51) Int. Cl.
*G06F 17/30* (2006.01)
(52) U.S. Cl. ........................................ 707/782; 707/786
(58) Field of Classification Search .................. 709/227, 709/226; 707/782, 786
See application file for complete search history.

(56) References Cited

U.S. PATENT DOCUMENTS

2003/0126265 A1* 7/2003 Aziz et al. ...................... 709/227
2004/0221038 A1* 11/2004 Clarke et al. .................. 709/226

FOREIGN PATENT DOCUMENTS

| JP | 2001-325041 | 11/2001 |
| JP | 2002-269394 | 9/2002 |
| WO | 02054224 A1 | 7/2002 |

OTHER PUBLICATIONS

European Patent Office, "European Search Report," App. 04255302. 4, dated Jan. 2, 2006, 3 pages.
Current Claims, EP App. 04255302.4, 8 pgs (23-31).
Anderson, Paul et al., "LCFG: The Next Generation," UKUUG Winter Conference, Feb. 2002, XP-002358652, 5 pages.
Anderson, Paul et al., "SmartFrog Meets LCFG Autonomous Reconfiguration with Central Policy Control," XP-002358653, Aug. 12, 2003, pp. 1-15.
Condor Team, "Condor® Version 6.4.7 Manual," University of Wisconsin-Madison, Jun. 9, 2003, , pp. 7-11, 64-100, 152-155, 176-179, 222-223, 349-357, XP-002358651.
Sun Microsystems, Inc., "Sun™ One Grid Engine, Enterprise Edition Administration and User's Guide," Sun Micro., Part No. 816-4739-11, Oct. 2002, Revision A, pp. 1-52, 145-167, XP. 002358654.

(Continued)

*Primary Examiner* — Jean B. Fleurantin
*Assistant Examiner* — Dennis Myint
(74) *Attorney, Agent, or Firm* — Osha • Liang LLP

(57) ABSTRACT

A mechanism for automating the process of establishing a resource grid is provided. First, a grid establishment component (GEC) is communicatively coupled to a plurality of nodes, wherein each node provides zero or more resources. Next, the GEC selects which of the nodes to include in a resource grid and establishes the resource grid by configuring each selected node (i.e., grid node) to participate as part of the resource grid. In addition, the GEC establishes one or more grid masters to manage access to the resources provided by the grid nodes. Once the grid nodes are configured, and one or more grid masters are established, the resource grid is ready for regular operation. By automating the grid establishment process, the GEC removes a significant burden from a system administrator, and greatly simplifies and accelerates the process of establishing a resource grid.

12 Claims, 10 Drawing Sheets

OTHER PUBLICATIONS

Gannis, Mike, "NPACI Releases Cluster Software Solution for Both Itanium2 and ×86 Processors," 2003 Online: News about the NPACI and SDSC Community, vol. 7, Issue 8, Apr. 16, 2003, http://www.npaci.edu/online/v7.8/rocks.html, retrieved Sep. 2, 2003, pp. 1-2.

Office Action from China for foreign patent application No. 200410073915.1 dated Feb. 15, 2008 (5 pgs) with English translation (5 pgs).

Current claims in China patent application No. 200410073915.1 (15 pgs).

Official Action from EPO for foreign patent application No. 04255302.4 dated Nov. 15, 2006 (9 pgs)—attached.

Current Claims in EPO patent application No. 04255302.4 (13 pgs)—attached.

EPO Communication for foreign application No. 04 255 302.4 -1243 dated Jul. 30, 2008 (8 pgs).

Current claims in EPO application No. 04 255 302.4-1243 (8 pgs).

European Patent Office Summons to Oral Proceedings for related Application 04255302.4; Mailed Aug. 28, 2009 (10 pages).

Anderson, P. et al.; "Technologies for Large-Scale Configuration Management"; GridWeaver; XP007909132; Revision 1.0; Dec. 9, 2002 (61 pages).

Anderson, P. et al.; "Experiences and Challenges of Large-Scale System Configuration"; GridWeaver; XP007909133; Revision 1.0; Mar. 26, 2003 (56 pages).

Anderson, P. et al.; "Large-Scale System Configuration with LCFG and SmartFrog"; GridWeaver; XP007909134; Revision 1.0; Jun. 6, 2003 (76 pages).

Viswanathan, V.; "Intel PXE Remote Boot Protocol"; Intel Corp.; XP15036542; Hillsboro, OR; Feb. 26, 1999 (9 pages).

Translation of Notice of the Reason for Refusal of Japanese Patent Application No. 2004-265081, Mailed on Nov. 16, 2010 (5 pages).

* cited by examiner

MECHANISM FOR AUTOMATICALLY ESTABLISHING A RESOURCE GRID

BACKGROUND

In many computer system implementations, it is desirable to configure a plurality of nodes to behave as a resource grid. Doing so makes it possible for the individual nodes to contribute its resource or resources to a resource pool. Once the resource grid is set up, the resources in the resource pool may be called upon by external components. Any type of resource may be pooled in this way, including but not limited to storage resources and processing resources.

Typically, a resource grid comprises a plurality of slave nodes and one or more master nodes. The slave nodes are the nodes that provide the resources, while the master node acts as the interface between the slave nodes and the external components. A node may be both a slave node and a master node; that is, the node may provide one or more resources and act as an interface between the slave nodes and the external components.

In fulfilling its role as an interface, a master node receives resource requests from external components. In response to a resource request, the master node determines which of the slave nodes to call upon to fulfill the request. In making this determination, the master node may take many factors into account including, for example, the current load on the slave nodes (this enables the master node to load balance across the slave nodes). Once a slave node is chosen, the master node forwards the resource request to the slave node for processing. In this manner, the master node coordinates use of the slave nodes, and acts as an access point for external components to access the resources provided by the slave nodes in the resource grid. Because the master node acts as an access point, the external components are shielded from the underlying structure and complexity of the resource grid. Thus, from the point of view of the external components, the resource grid appears as a single pool of resources accessible through the master node.

Resource grids have a number of advantageous properties. Because they can comprise any number of nodes, resource grids are generally quite scalable (more nodes can be added to increase the amount of resources in the resource pool). Resource grids are also fault tolerant. If a slave node goes down, the master node can simply stop using that slave node and forward requests to other slave nodes. Resource grids may also be load balanced so that all slave nodes have appropriate workloads to maximize efficiency. Because of these and other properties, it is desirable in many computing applications to implement a resource grid.

Currently, the process of implementing a resource grid is quite labor and time intensive from the standpoint of a system administrator. Specifically, the administrator has to perform a number of manual tasks on each node of a resource grid to enable that node to function as part of the resource grid. These manual tasks include, for example, manually accessing each node, loading grid participation software into each node, configuring and running grid participation software, and setting a node to be a slave node, a master node, or both. These manual tasks can require a significant amount of time to perform, and since they have to be performed on every node, the amount of administrator time required to set up an entire resource grid can be substantial, especially if the resource grid comprises a large number of nodes.

SUMMARY

To ease the burden on an administrator, one embodiment of the present invention provides a mechanism for automating, in large part or in whole, the process of establishing a resource grid.

In one embodiment, a grid establishment component (GEC) is communicatively coupled to a plurality of nodes, wherein each node provides zero or more resources. After the GEC is coupled to the nodes, the GEC determines which of the nodes to include in a resource grid. This may involve, for example, determining on which of the nodes the GEC can perform the grid establishment operations. Some or all of the nodes may be included in the resource grid (the nodes that are selected to be included in the resource grid are hereafter referred to as the grid nodes).

After the grid nodes are determined, the GEC proceeds to establish the resource grid. In one embodiment, the GEC does so by configuring each grid node to enable it to participate as part of the resource grid. This may involve, for example, causing a grid node to execute a grid facilitation agent, and deploying a grid participation module to the grid facilitation agent for running on the grid node. To complete establishment of the resource grid, the GEC establishes one or more grid masters to manage access to the resources provided by the grid nodes. The GEC makes the grid master aware of all of the nodes (the slave nodes) that it is to manage, and makes the slave nodes aware of the grid master. Once the slave nodes and the grid master are aware of each other, they can cooperate to behave as a resource grid. Thereafter, the resource grid is ready for regular operation.

By automating the grid establishment process, the GEC removes a significant burden from the administrator, and greatly simplifies and accelerates the process of establishing a resource grid.

DETAILED DESCRIPTION OF EMBODIMENT(S)

Overview

In accordance with one embodiment of the present invention, there is provided a grid establishment component (hereinafter, GEC) for automating, in large part or in whole, the process of establishing a resource grid. As used herein, the term "resource grid" refers broadly to any collection of nodes that cooperate to provide a pool of one or more resources.

To establish a resource grid, the GEC is communicatively coupled to a plurality of nodes. For purposes of the present invention, a node may be any mechanism capable of providing zero or more resources. These resources may be any type of resources, including but not limited to storage resources and processing resources. A node may be a physical entity (e.g. a computer, peripheral, etc.), a logical entity (e.g. a software process), or a representative entity (e.g. an entity representing a cluster of computers).

Figure 1:
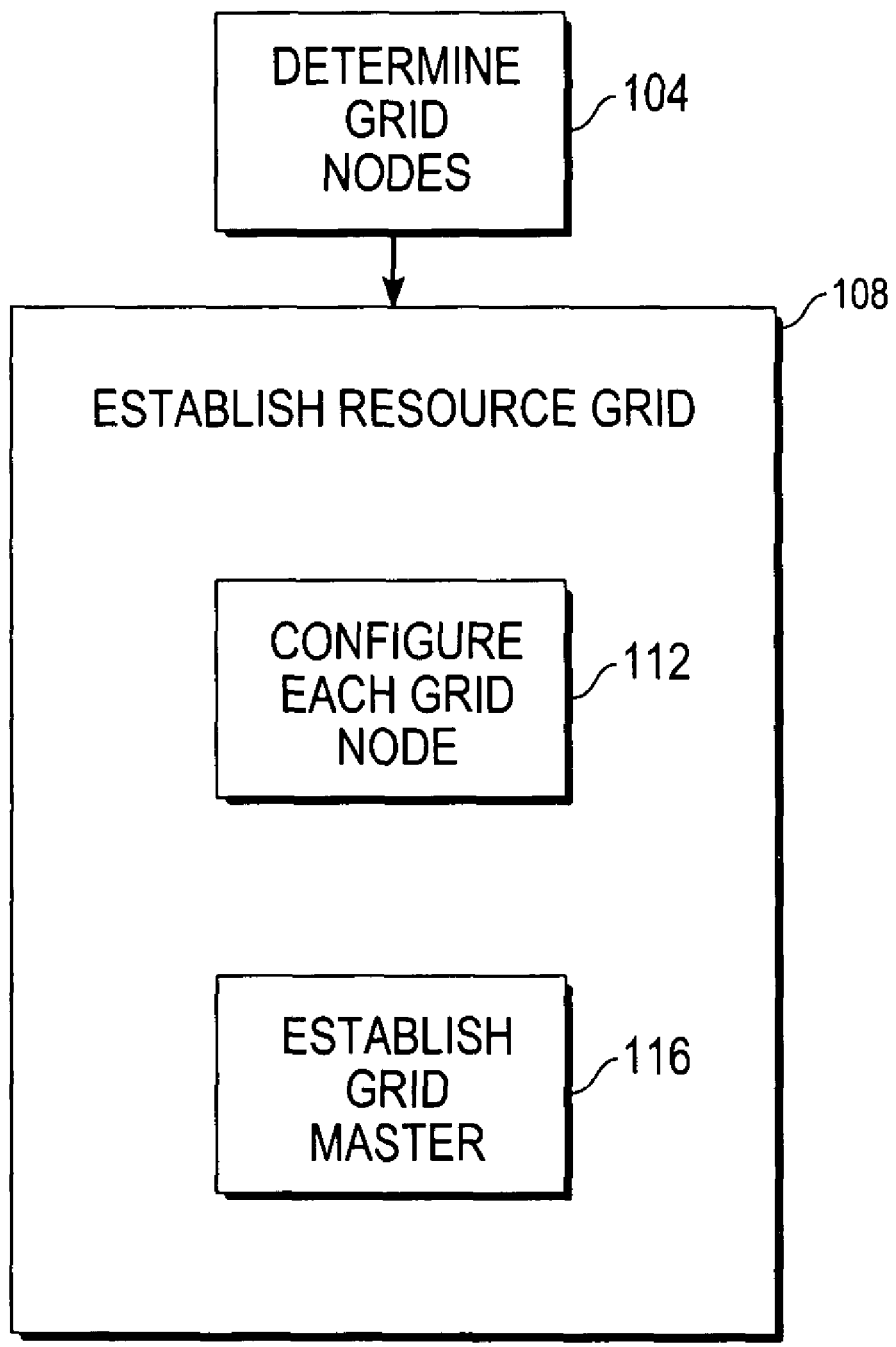
FIG. 1 is a high level operational flow diagram illustrating the operation of a grid establishment component in establishing a resource grid, in accordance with one embodiment of the present invention.

After the GEC is coupled to the plurality of nodes, the GEC proceeds to establish a resource grid. In one embodiment, the GEC can establish the resource grid with or without input from an administrator. FIG. 1 shows a high level operational flow diagram illustrating the operation of the GEC in establishing a resource grid.

Initially, the GEC determines (block 104) from the plurality of nodes, which nodes to include in the resource grid. This may be as simple as receiving a list of nodes from an administrator. As an alternative, the GEC may determine which nodes to include in the resource grid by carrying out a node discovery/selection process. All or just some of the plurality of nodes may be included in the resource grid. The set of nodes selected to be included in the resource grid are hereinafter referred to as the grid nodes.

After the grid nodes are determined, the GEC proceeds to establish (block 108) the resource grid. In one embodiment, the GEC establishes the resource grid by configuring (block 112) each of the grid nodes to enable them to participate as part of the resource grid. This may entail deploying a grid participation module to each grid node, and causing the grid node to run that module. To complete the establishment of the resource grid, the GEC establishes (block 116) one or more grid masters to manage access to the resources provided by the grid nodes. In one embodiment, only one grid master is established for the resource grid; however, more than one grid master may be established if so desired. The GEC may establish itself as the grid master, or it may establish one of the grid nodes as the grid master. In addition to establishing the grid master, the GEC configures all of the other grid nodes to operate as slave nodes. The GEC then makes the grid master aware of all of the slave nodes that it is to manage, and makes the slave nodes aware of the grid master. Once the slave nodes and the grid master are aware of each other, they can operate as a resource grid. In this manner, the resource grid is automatically established by the GEC.

The above discussion provides a high level, general description of the operation of the GEC. Depending upon the particular system in which the GEC is implemented, the operations performed within blocks 104-116 may differ. To facilitate a complete understanding of the invention, the operation of the GEC will now be described with reference to several specific implementations. It should be noted, though, that the following examples are provided for illustrative purposes only. They are not meant to be comprehensive or exclusive. The GEC may be implemented in these and many other systems. Thus, the invention should not be construed to be limited to the following sample implementations.

First Sample Implementation

Figure 2A:
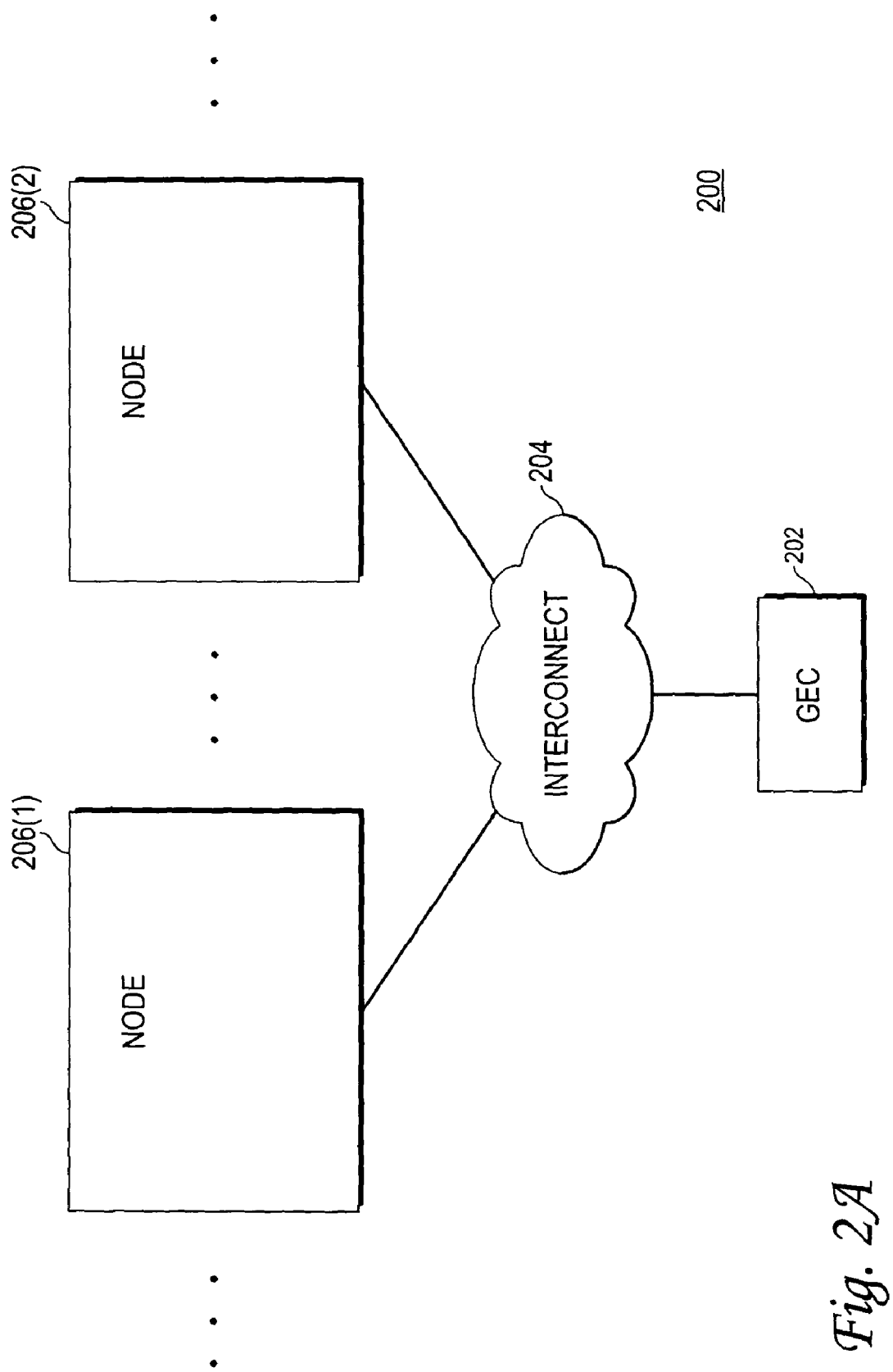
FIGS. 2A-2C show functional block diagrams of a first sample system in which one embodiment of the present invention may be implemented.

FIG. 2A shows a functional block diagram of a first sample system 200 in which one embodiment of the present invention may be implemented. FIG. 2A shows the system 200 prior to establishment of a resource grid. As shown, system 200 comprises a plurality of nodes 206 coupled together via an interconnect 204. Also coupled to the interconnect 204 is a GEC 202. Through the interconnect 204, GEC 202 is able to communicate with at least some of the nodes 206 to establish a resource grid.

In one embodiment, the interconnect 204 in system 200 is coupled to a privileged port of some or all of the nodes 206. This privileged port (which may, for example, be a serial port) enables a component (e.g. the GEC 202) to send instructions to a node 206 to cause the node 206 to perform one or more basic functions. For example, if GEC 202 has access, via interconnect 204, to the privileged port of a node 206, GEC 202 can send an instruction to the node 206 to cause the node to reboot. As will be discussed in greater detail below, this ability can be exploited by GEC 202 to configure a node to participate as part of a resource grid.

To establish a resource grid in system 200, GEC 202 performs the general operations shown in FIG. 1. Specifically, GEC 202 begins by determining (block 104 of FIG. 1) from the plurality of nodes 206 which nodes to include in the resource grid. In system 200, GEC 202 can make this determination by determining to which of the nodes 206 the GEC 202 has access to a privileged port. This may be done, for example, by probing each of the nodes 206 for a MAC address of the privileged port. If the GEC 202 has access to a privileged port of a node 206, this probe will return a MAC address. In this manner, GEC 202 can obtain the MAC addresses of all of the privileged ports to which it has access. In one embodiment, all of the nodes 206 to which the GEC 202 has access to a privileged port will be included in the resource grid. The nodes 206 selected to be included in the resource grid will be referred to hereinafter as grid nodes. For the sake of illustration, it will be assumed that nodes 206(1) and 206(2) (and possibly other nodes, not shown) are selected as grid nodes.

As an alternative to probing the nodes 206 for MAC addresses, GEC 202 may determine which nodes to include in the resource grid by simply obtaining a list of nodes or MAC addresses from an administrator. This and other implementations are possible for block 104

After the grid nodes are determined, GEC 202 proceeds to establish (block 108 of FIG. 1) a resource grid with the grid nodes. To do so, GEC 202 configures (block 112 of FIG. 1) each grid node to enable it to participate as part of the resource grid. In system 200, GEC 202 configures each grid node as follows.

Figure 2B:
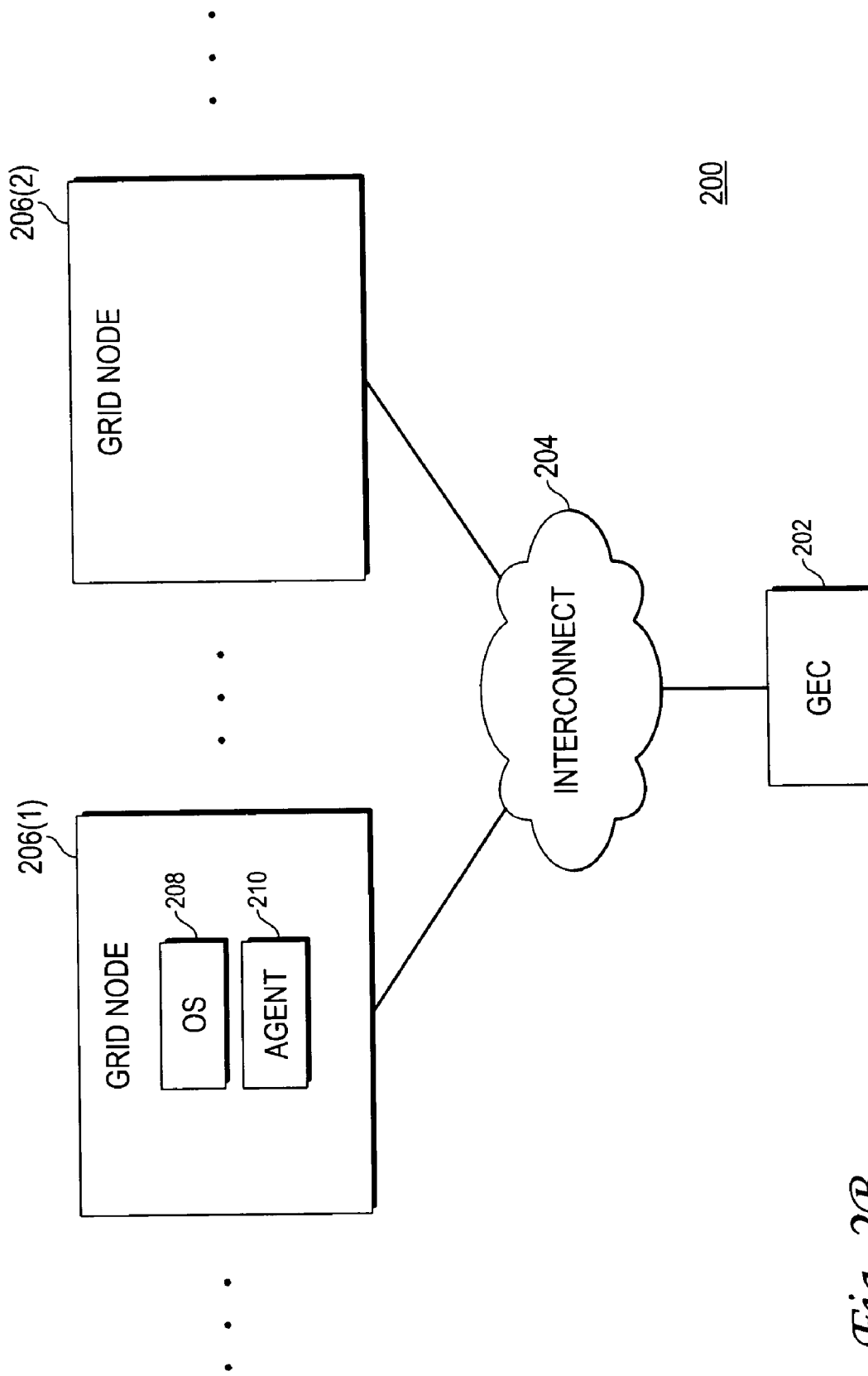

Initially, GEC 202 sends a signal to the privileged port of a grid node to cause the grid node to do a "network reboot". When the grid node performs a network reboot, it does not boot up with the operating system (if any) stored on the grid node. Rather, it boots up with an image of an operating system obtained from another component. A network reboot may be facilitated using the product entitled JumpStart, available from Sun Microsystems of Santa Clara, Calif. In one embodiment, this operating system image is provided by the GEC 202. As an alternative, the grid node may obtain the operating system image from another component (not shown). In one embodiment, the operating system image includes not just an operating system but also a grid facilitation agent (hereinafter, agent). Thus, when the grid node completes its reboot operation, it will be executing an agent as well as the operating system. FIG. 2B shows a functional block diagram of system 200 after a grid node 206(1) has been rebooted in this manner. As shown, grid node 206(1) now has an operating system (OS) 208 and an agent 210 executing thereon. In this manner, the GEC 202 causes an agent 210 to be loaded and executed on the grid node 206(1).

In one embodiment, the agent 210 comprises functionality for facilitating the establishment, maintenance, and ongoing management of a resource grid. For example, agent 210 comprises functionality for communicating with GEC 202. Agent 210 also comprises functionality for receiving grid-related modules from GEC 202, and installing, configuring, and running those modules on the grid node as directed by the GEC 202. Agent 210 further comprises functionality for facilitating communication between the grid related software installed on the grid module 206(1) and the GEC 202. Basically, with the agent 210 installed and running on a grid node, GEC 202 can cause any grid-related operations to be performed on the grid node 206(1).

Figure 2C:
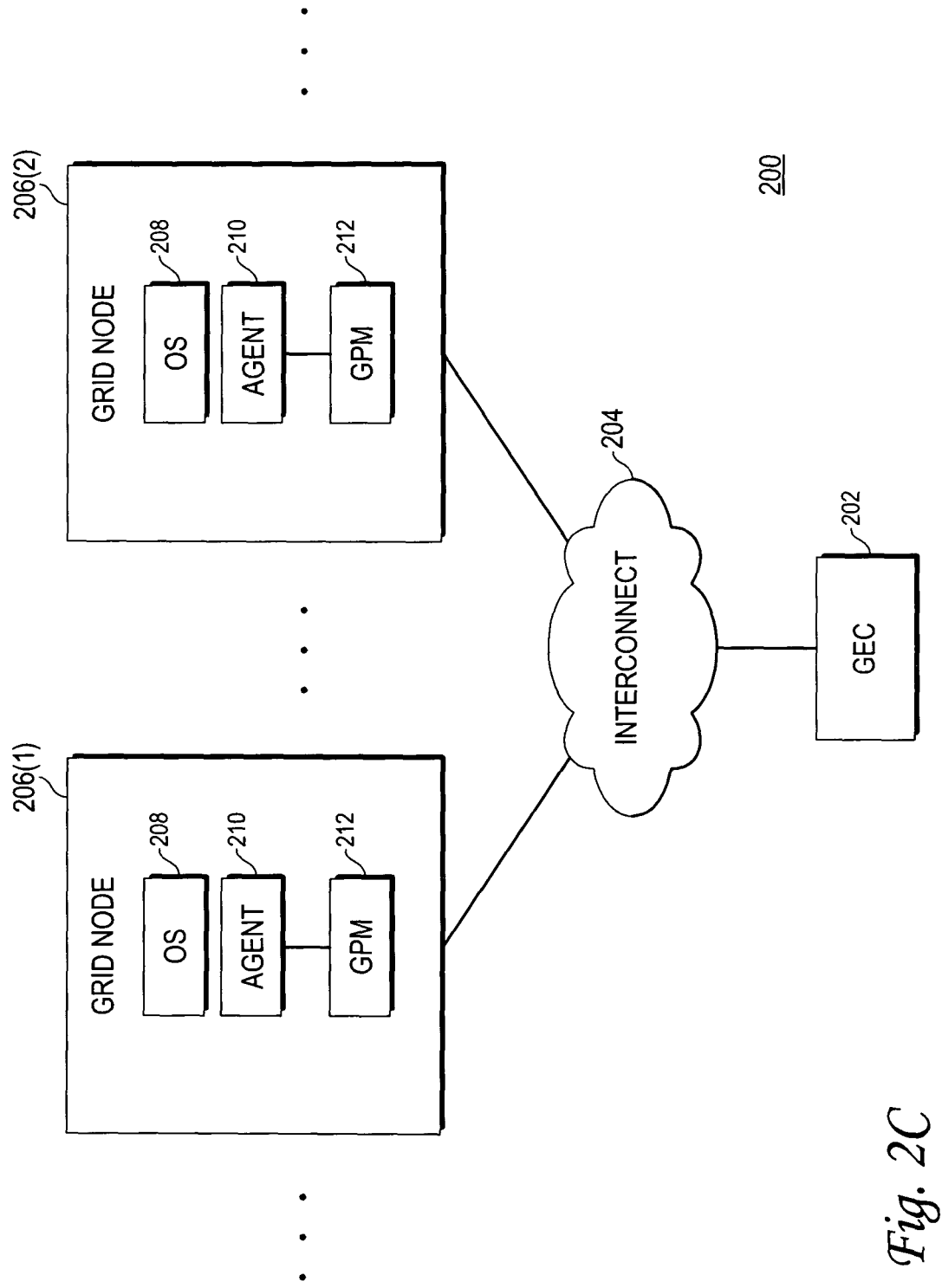

After an agent 210 is installed and executed on a grid node 206(1), the GEC 202 continues the configuration process (block 112 of FIG. 1) by deploying a grid participation module (hereinafter, GPM) to the agent 210, and instructing the agent 210 to install, run, and configure the GPM on the grid node 206(1). In response to this instruction, the agent 210 installs, runs, and configures the GPM on the grid node 206 (1). A functional block diagram of the grid node 206(1) after the GPM has been deployed is shown in FIG. 2C.

In one embodiment, the GPM 212 comprises functionality for enabling the grid node 206(1) to participate as part of the resource grid. For example, if the grid node 206(1) is to be a slave node, then the GPM 212 may comprise functionality for receiving resource requests from a grid master, processing the requests, and providing responses (if any) to the grid master. If the grid node 206(1) is to be a grid master, then the GPM 212 may comprise functionality for receiving resource requests from external components, determining which slave node is to be called upon to process the request, and forwarding the resource request to the appropriate slave node. In one embodiment, the GPM 212 is the same module for both slave and master operation. The module is just configured differently, depending upon the intended mode of operation. As an alternative, different GPM's 212 may be deployed for slave and master operation. These and other implementations are within the scope of the present invention.

In addition to deploying the GPM 212, GEC 202 may further deploy other applications and data sets to the agent 210, and instruct the agent 210 to install, run, and configure those applications with the data sets. These applications may be called upon by the GPM 212 in processing resource requests. Because the agent 210 comprises functionality for receiving any module from the GEC 202, and installing, running, and configuring that module on the grid node 206(1), the agent 210 can do as the GEC 202 asks. Thus, the GEC 202 has great latitude and control over what it can deploy on the grid node 206(1).

In the manner described, GEC 202 configures a grid node 206(1) to enable it to participate as part of a resource grid. GEC 202 repeats this process for each grid node. Thus, as shown in FIG. 2C, at the end of the configuration process, each grid node 206(1), 206(2) has an agent 210 and a GPM 212 installed and running thereon.

To complete the resource grid establishment process, the GEC 202 establishes (block 116 of FIG. 1) one or more grid masters to manage access to the resources provided by the grid nodes. In one embodiment, only one grid master is established for the resource grid; however, if so desired, more than one grid master may be established. The GEC 202 may establish itself as a grid master (in which case the GEC 202 comprises functionality for acting as a grid master), or it may establish one of the grid nodes as a grid master (for example, by deploying the proper GPM 212 to the grid node, or by configuring the GPM 212 on the grid node to act as a grid master). The GEC 202 may determine which component (itself or one of the grid nodes) to establish as the grid master based upon some built-in logic or based upon input provided by an administrator.

After a grid master is established, the GEC 202 makes the grid master aware of all of the nodes (the slave nodes) that it is to manage, and makes the slave nodes aware of the grid master. Once the slave nodes and the grid master are aware of each other, they can cooperate to behave as a resource grid. In this manner, the GEC 202 automatically establishes the resource grid.

Second Sample Implementation

Figure 3A:
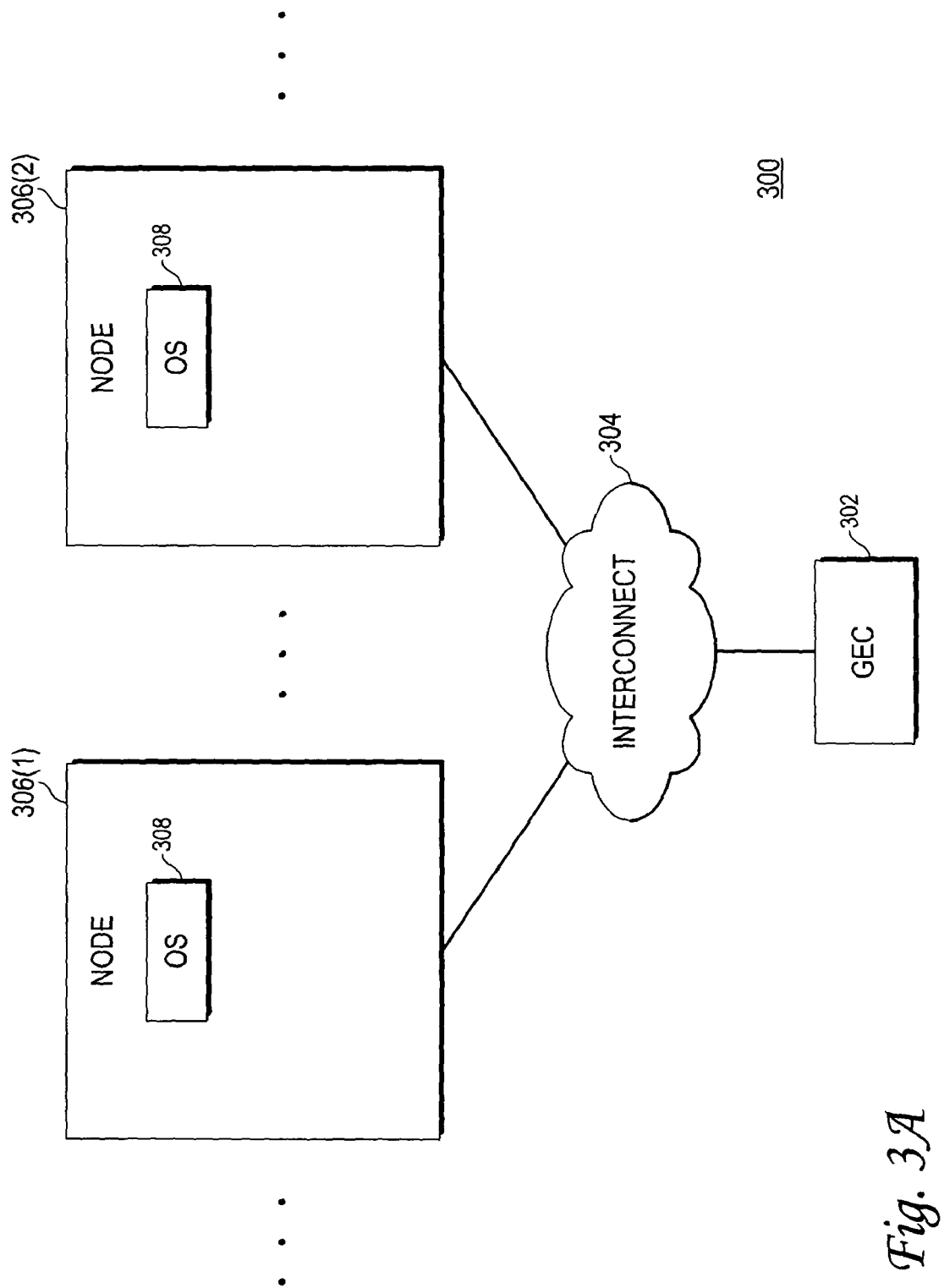
FIGS. 3A-3C show functional block diagrams of a second sample system in which one embodiment of the present invention may be implemented.

FIG. 3A shows a functional block diagram of a second sample system 300 in which another embodiment of the present invention may be implemented. FIG. 3A shows the system 300 prior to establishment of a resource grid. Like system 200, system 300 comprises a plurality of nodes 306 and a GEC 302, all coupled together via an interconnect 304. However, unlike system 200, the interconnect 304 of system 300 is not (or does not need to be) coupled to any privileged port of any of the nodes 306. In addition, at least some of the nodes 306 of system 300 are executing an OS 308 with a capability to allow other components (such as GEC 302) to install and run programs on the node 306, provided the other components have sufficient privileged access to the OS 308 to order such an action. With such a capability available in the OS 308, the GEC 302 can take advantage of the OS 308 to establish a resource grid.

To establish a resource grid in system 300, GEC 302 performs the general operations shown in FIG. 1. Specifically, GEC 302 begins by determining (block 104 of FIG. 1) from the plurality of nodes 306 which nodes to include in the resource grid. In system 300, GEC 302 can make this determination by determining on which of the nodes 306 the GEC 302 has sufficient privileged access to cause a program to be installed and run. This may be done, for example, by communicating with the OS 308 on each node 306, and implementing an authorization process to determine whether the GEC 302 has sufficient privileged access to that OS 308 to cause a program to be installed and run. This process may involve providing some authorization/verification information (e.g. an authorization code or password). If so, this information may be provided to the GEC 302 by an administrator. In one embodiment, all of the nodes 306 on which the GEC 302 has sufficient privileged access to cause a program to be installed and run are selected as grid nodes and are included in the resource grid. For the sake of illustration, it will be assumed that nodes 306(1) and 306(2) (and possibly other nodes, not shown) are selected as grid nodes.

As an alternative to communicating with the nodes 306, GEC 302 may determine which nodes to include in the resource grid by simply obtaining a list of nodes from an administrator. This and other implementations are possible for block 104

After the grid nodes are determined, GEC 302 proceeds to establish (block 108 of FIG. 1) a resource grid with the grid nodes. To do so, GEC 302 configures (block 112 of FIG. 1) each grid node to enable it to participate as part of the resource grid. In system 300, GEC 302 configures each grid node as follows.

Figure 3B:
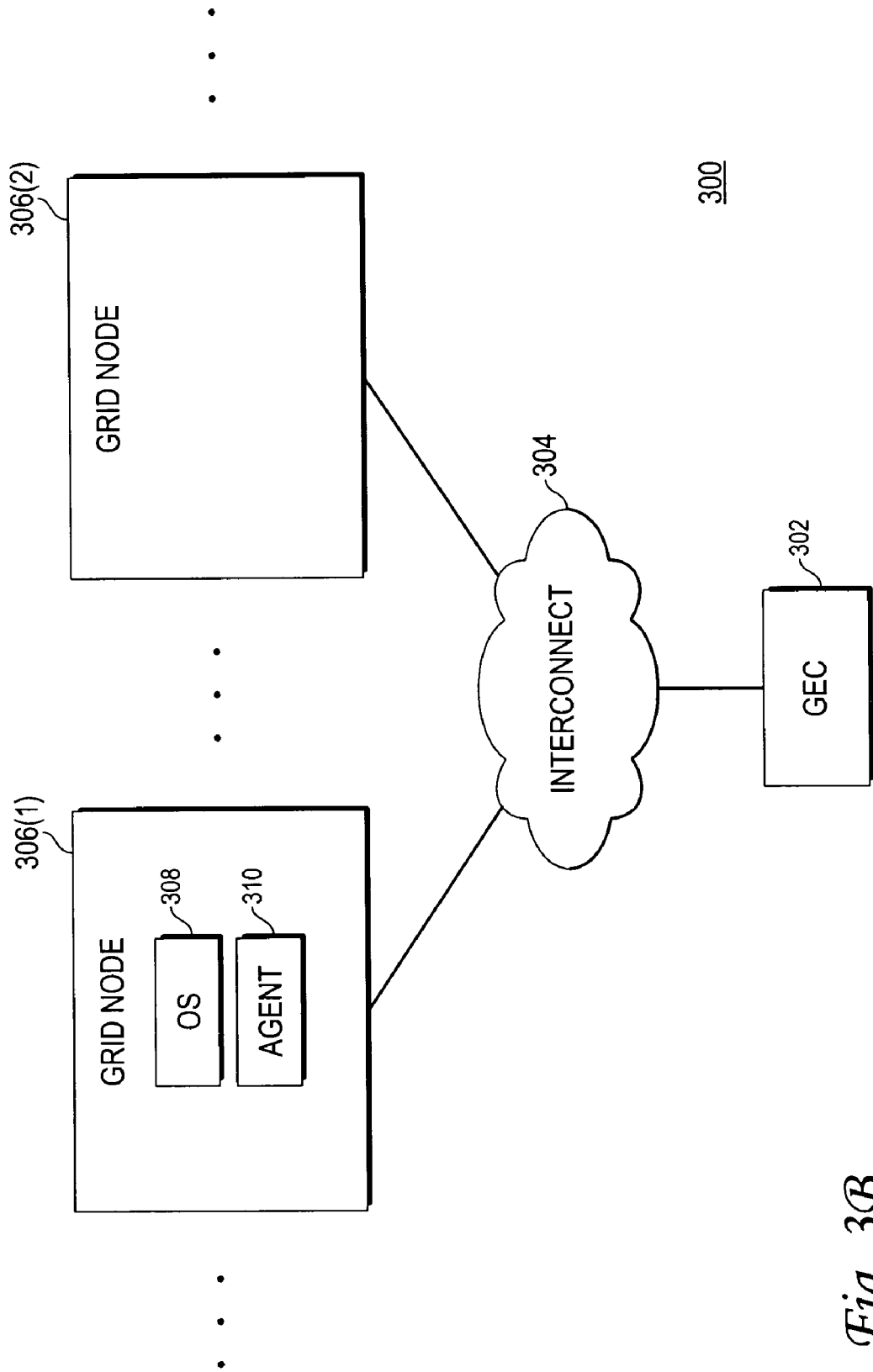

Initially, GEC 302 selects a grid node (e.g. node 306(1)). It then communicates with the OS 308 on that grid node to gain privileged access thereto. This may involve implementing an authentication process in which the GEC 302 provides some authorization/verification information to the OS 308. After the GEC 302 gains privileged access to the OS 308, it deploys an agent (this agent may have functionality similar or even identical to that of agent 210) to the OS 308, and instructs the OS 308 to install and run the agent. Barring an error, the OS 308 will do as the GEC 302 asks. In this manner, an agent is installed and run on a grid node. FIG. 3B shows a functional block diagram of system 300 after an agent 310 has been deployed on grid node 306(1). With the agent 310 installed and running on grid node 306(1), GEC 302 can now cause any grid-related operations to be performed on the grid node 306(1).

Figure 3C:
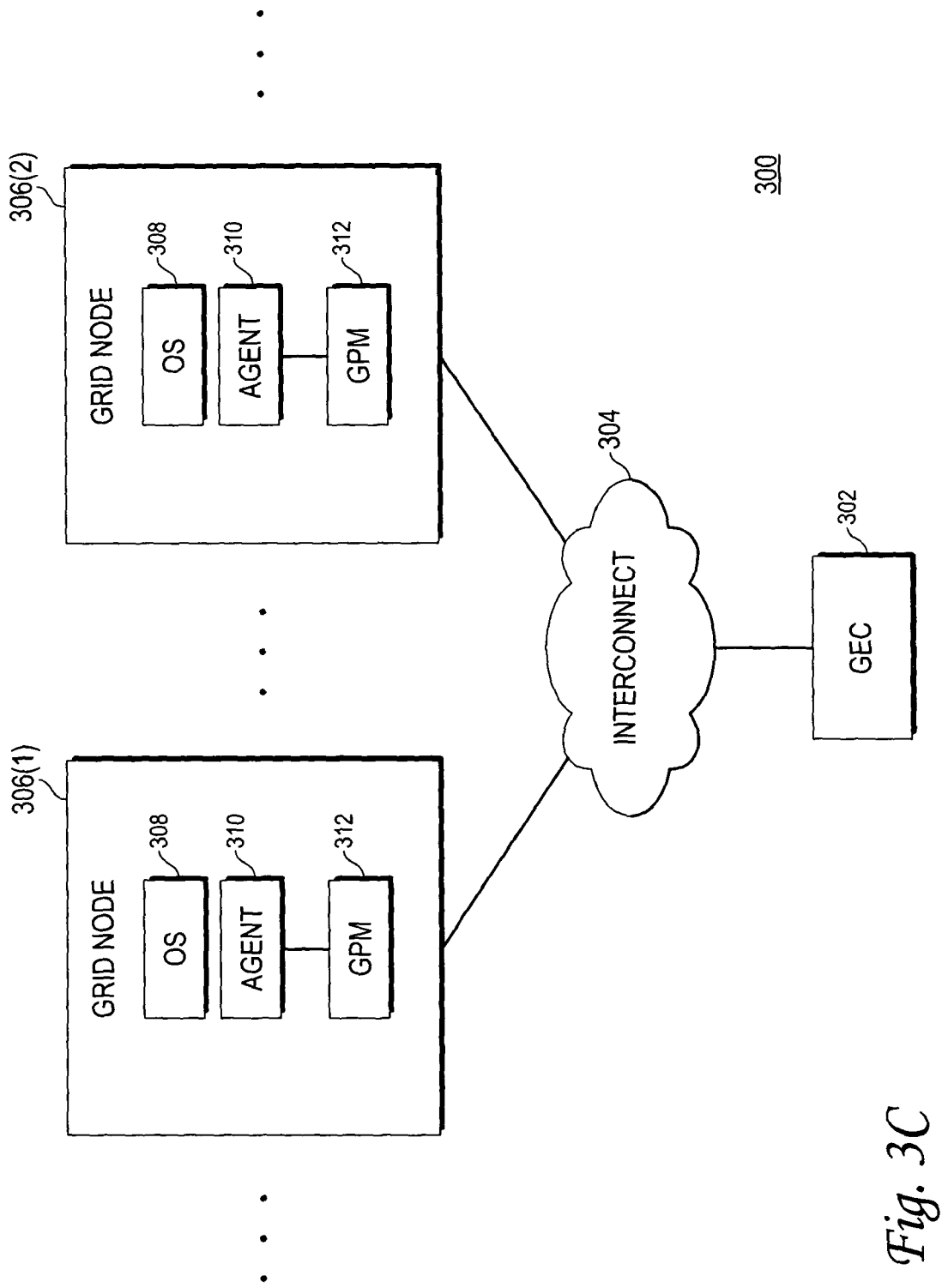

To further configure (block 112 of FIG. 1) the grid node 306(1), the GEC 302 deploys a GPM to the agent 310, and instructs the agent 310 to install and run the GPM on the grid node 306(1). In response to this instruction, the agent 310 installs and runs the GPM on the grid node 306(1). A functional block diagram of the grid node 306(1) after the GPM has been deployed is shown in FIG. 3C.

In one embodiment, like GPM 212 described previously, GPM 312 comprises functionality for enabling the grid node 306(1) to participate as part of the resource grid. For example, if the grid node 306(1) is to be a slave node, then the GPM 312 may comprise functionality for receiving resource requests from a grid master, processing the requests, and providing responses (if any) to the grid master. If the grid node 306(1) is to be a grid master, then the GPM 312 may comprise functionality for receiving resource requests from external components, determining which slave node is to be called upon to process the request, and forwarding the resource request to the appropriate slave node. In one embodiment, the GPM 312 is the same module for both slave and master operation. The module is just configured differently, depending upon the intended mode of operation. As an alternative, different GPM's 312 may be deployed for slave and master operation. These and other implementations are within the scope of the present invention.

In addition to deploying the GPM 312, GEC 302 may further deploy other applications and data sets to the agent 310, and instruct the agent 310 to install, run, and configure those applications with the data sets. These applications may be called upon by the GPM 212 in processing resource requests. Because the agent 310 comprises functionality for receiving any module from the GEC 302, and installing, running, and configuring that module on the grid node 306(1), the agent 310 can do as the GEC 302 asks. Thus, the GEC 302 has great latitude and control over what it can deploy on the grid node 306(1).

In the manner described, GEC 302 can configure a grid node 306(1) to enable it to participate as part of a resource grid. GEC 302 repeats this process for each grid node. Thus, as shown in FIG. 3C, at the end of the configuration process, each grid node 306(1), 306(2) has an agent 310 and a GPM 312 installed and running thereon.

To complete the resource grid establishment process, the GEC 302 establishes (block 116 of FIG. 1) one or more grid masters to manage access to the resources provided by the grid nodes. In one embodiment, only one grid master is established for the resource grid; however, if so desired, more than one grid master may be established. The GEC 302 may establish itself as a grid master (in which case the GEC 302 comprises functionality for acting as a grid master), or it may establish one of the grid nodes as a grid master (for example, by deploying the proper GPM 312 to the grid node, or by configuring the GPM 312 on the grid node to act as a grid master). The GEC 302 may determine which component (itself or one of the grid nodes) to establish as the grid master based upon some built-in logic or based upon input provided by an administrator.

After a grid master is established, the GEC 302 makes the grid master aware of all of the nodes (the slave nodes) that it is to manage, and makes the slave nodes aware of the grid master. Once the slave nodes and the grid master are aware of each other, they can cooperate to behave as a resource grid. In this manner, the GEC 302 automatically establishes the resource grid.

Third Sample Implementation

Figure 4A:
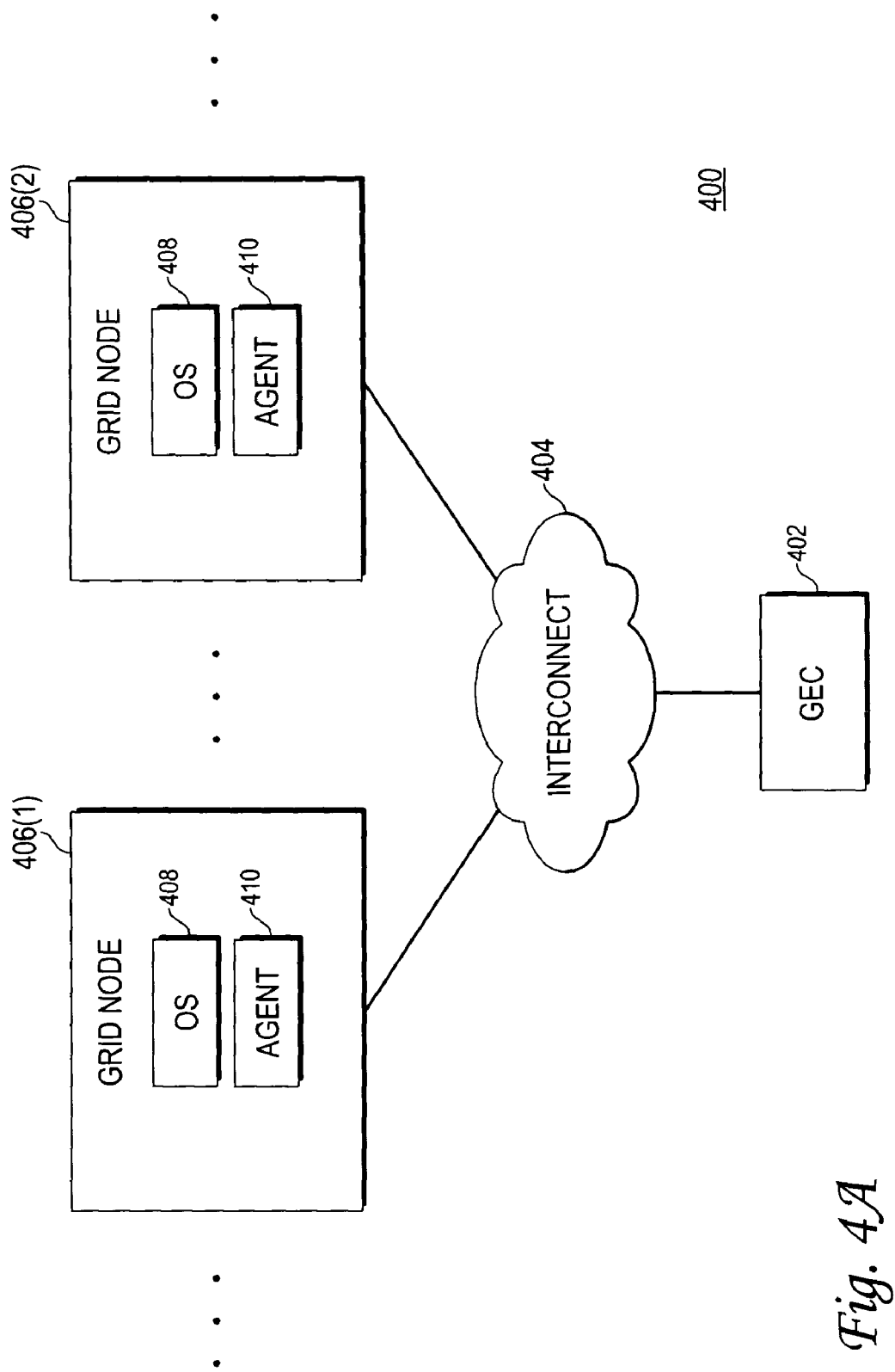
FIGS. 4A-4B show functional block diagrams of a third sample system in which one embodiment of the present invention may be implemented.

FIG. 4A shows a functional block diagram of a third sample system 400 in which yet another embodiment of the present invention may be implemented. FIG. 4A shows the system 400 prior to establishment of a resource grid. Like system 300, system 400 comprises a plurality of nodes 406 and a GEC 402, all coupled together via an interconnect 404. However, unlike system 300, at least some of the nodes 406 of system 400 already have an agent 410 (this agent may have functionality similar or even identical to that of agent 210) installed and executing thereon.

To establish a resource grid in system 400, GEC 402 performs the general operations shown in FIG. 1. Specifically, GEC 402 begins by determining (block 104 of FIG. 1) from the plurality of nodes 406 which nodes to include in the resource grid. In system 400, GEC 402 can make this determination by determining on which of the nodes 406 an agent 410 is already installed and running. This may be done, for example, by attempting agent communication on each node 406. If a node 406 provides an appropriate agent response, then it is known that that node 406 has an agent 410 installed and running thereon. In one embodiment, all nodes 406 on which an agent 410 is already installed and running are selected as grid nodes and are included in the resource grid. For the sake of illustration, it will be assumed that nodes 406(1) and 406(2) (and possibly other nodes, not shown) are selected as grid nodes.

As an alternative to communicating with the nodes 406, GEC 402 may determine which nodes to include in the resource grid by simply obtaining a list of nodes from an administrator. This and other implementations are possible for block 104

After the grid nodes are determined, GEC 402 proceeds to establish (block 108 of FIG. 1) a resource grid with the grid nodes. To do so, GEC 402 configures (block 112 of FIG. 1) each grid node to enable it to participate as part of the resource grid. In system 400, GEC 402 configures each grid node as follows.

Figure 4B:
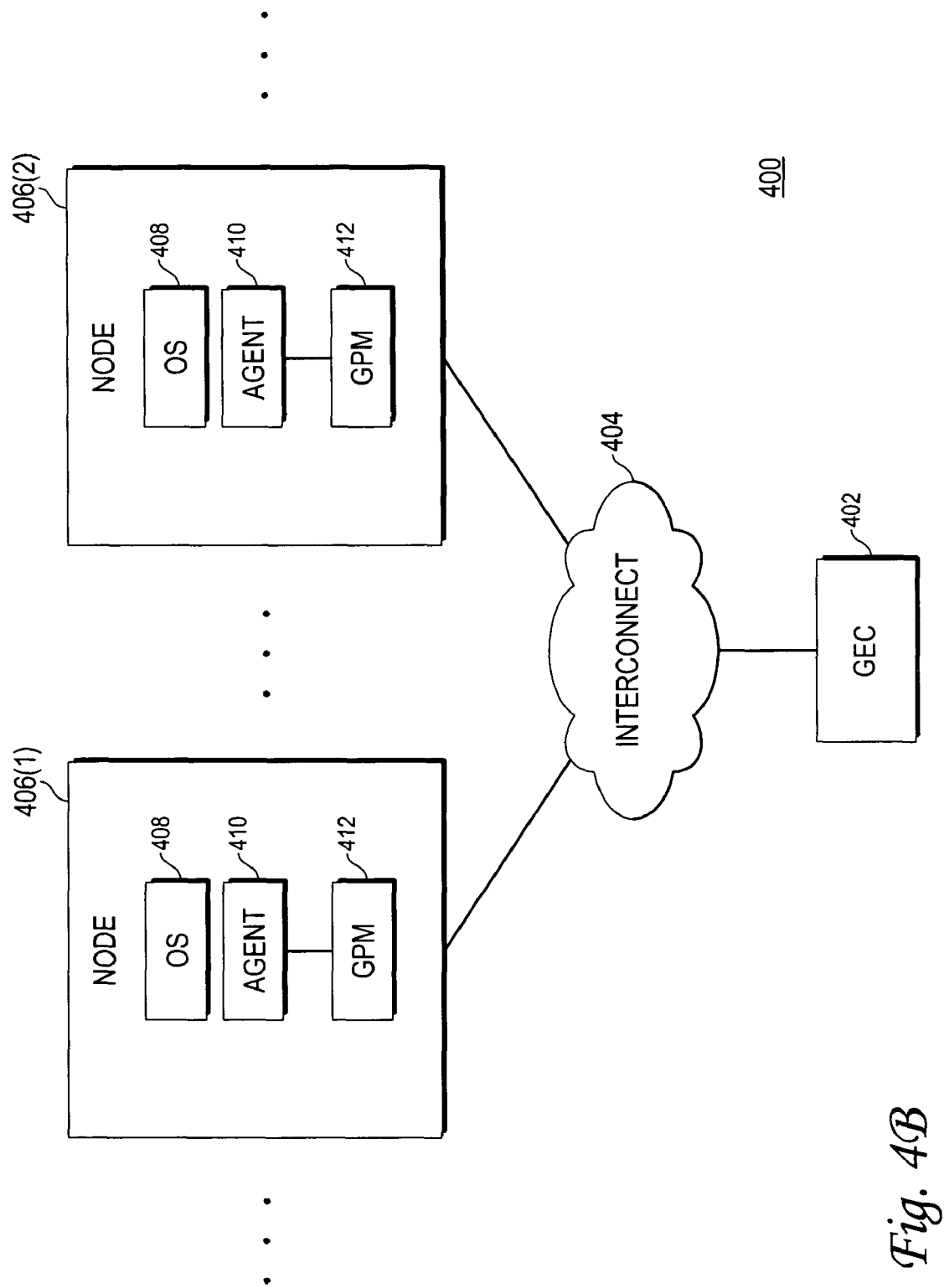

Initially, GEC 402 selects a grid node (e.g. node 406(1)). Because each grid node already has an agent 410 running thereon, the GEC 402 can cause any grid-related operations to be performed on the grid node 406(1). Thus, to configure (block 112 of FIG. 1) the grid node 406(1), the GEC 402 deploys a GPM to the agent 410, and instructs the agent 410 to install and run the GPM on the grid node 406(1). In response to this instruction, the agent 410 installs and runs the GPM on the grid node 406(1). A functional block diagram of the grid node 406(1) after the GPM has been deployed is shown in FIG. 4B.

In one embodiment, like GPM 212 described previously, GPM 412 comprises functionality for enabling the grid node 406(1) to participate as part of the resource grid. For example, if the grid node 406(1) is to be a slave node, then the GPM 412 may comprise functionality for receiving resource requests from a grid master, processing the requests, and providing responses (if any) to the grid master. If the grid node 406(1) is to be a grid master, then the GPM 412 may comprise functionality for receiving resource requests from external components, determining which slave node is to be called upon to process the request, and forwarding the resource request to the appropriate slave node. In one embodiment, the GPM 412 is the same module for both slave and master operation. The module is just configured differently, depending upon the intended mode of operation. As an alternative, different GPM's 412 may be deployed for slave and master operation. These and other implementations are within the scope of the present invention.

In addition to deploying the GPM 412, GEC 402 may further deploy other applications and data sets to the agent 410, and instruct the agent 410 to install, run, and configure those applications with the data sets. These applications may be called upon by the GPM 212 in processing resource requests. Because the agent 410 comprises functionality for receiving any module from the GEC 402, and installing, running, and configuring that module on the grid node 406(1), the agent 410 can do as the GEC 402 asks. Thus, the GEC 402 has great latitude and control over what it can deploy on the grid node 406(1).

In the manner described, GEC 402 configures a grid node 406(1) to enable it to participate as part of a resource grid. GEC 402 repeats this process for each grid node. Thus, as shown in FIG. 4B, at the end of the configuration process, each grid node 406(1), 406(2) has an agent 410 and a GPM 412 installed and running thereon.

To complete the resource grid establishment process, the GEC 402 establishes (block 116 of FIG. 1) one or more grid masters to manage access to the resources provided by the grid nodes. In one embodiment, only one grid master is established for the resource grid; however, if so desired, more than one grid master may be established. The GEC 402 may establish itself as a grid master (in which case the GEC 402 comprises functionality for acting as a grid master), or it may establish one of the grid nodes as a grid master (for example, by deploying the proper GPM 412 to the grid node, or by configuring the GPM 412 on the grid node to act as a grid master). The GEC 402 may determine which component (itself or one of the grid nodes) to establish as the grid master based upon some built-in logic or based upon input provided by an administrator.

After a grid master is established, the GEC 402 makes the grid master aware of all of the nodes (the slave nodes) that it is to manage, and makes the slave nodes aware of the grid master. Once the slave nodes and the grid master are aware of each other, they can cooperate to behave as a resource grid. In this manner, the GEC 402 automatically establishes the resource grid.

Hardware Overview

For purposes of the present invention, the GEC 202, 302, 402 may be implemented using any known technology. For example, the GEC may be implemented using hardware logic components (e.g. one or more ASIC's), or it may be implemented as a set of instructions executed by one or more processors. These and other implementations are within the scope of the present invention.

Figure 5:
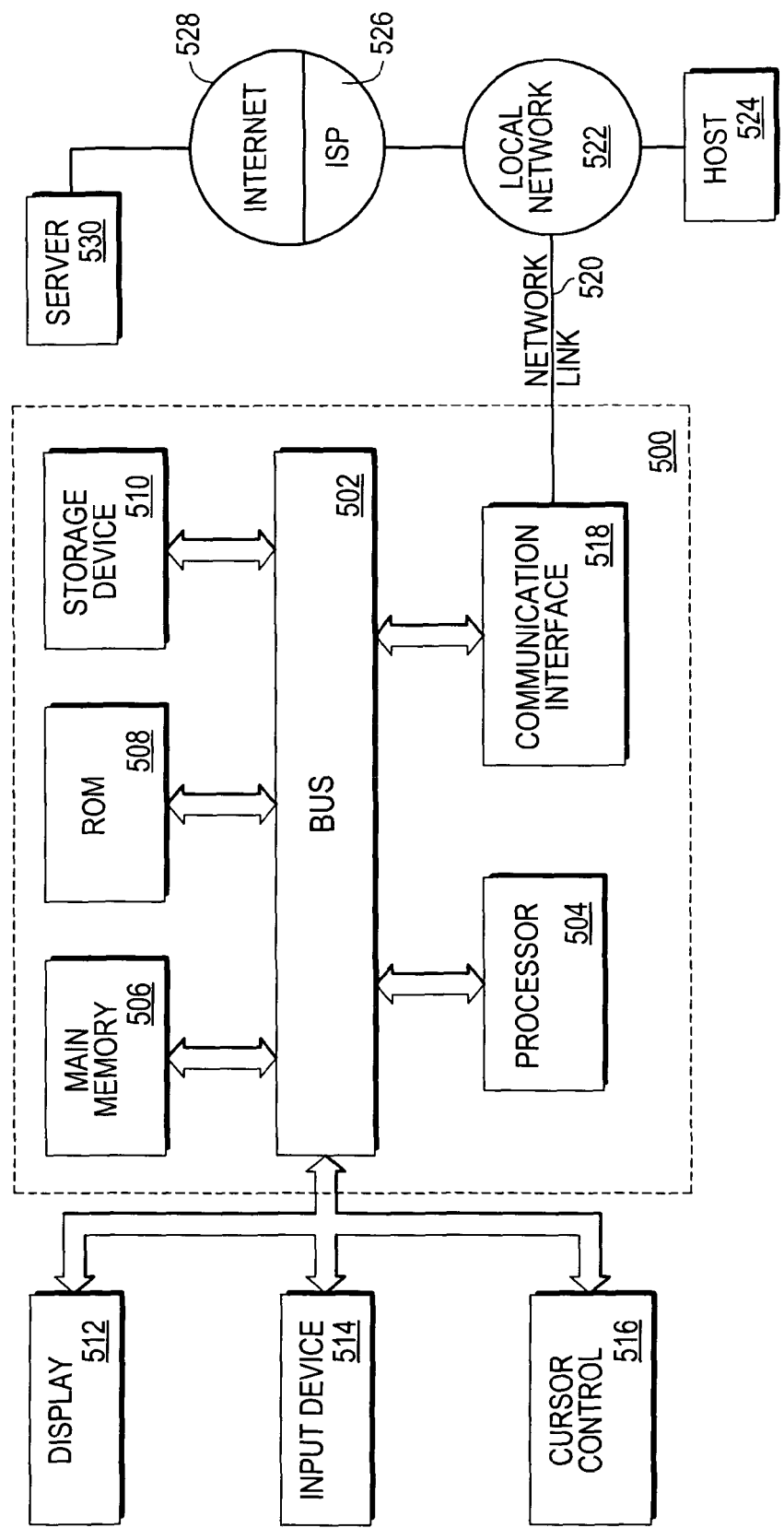
FIG. 5 is a hardware block diagram of a sample computer system in which one embodiment of the GEC of FIGS. 2-4 may be executed.

In one embodiment, the GEC 202, 302, 403 is implemented as a set or sets of instructions executable by one or more processors. In such an embodiment, the GEC may be executed in a computer system such as that shown in FIG. 5. The computer system 500 of FIG. 5 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 may also be further used to store temporary variables or other intermediate information during execution of instructions by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

According to one embodiment, the functionality of the present invention is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, computer readable storage medium or transmission media. Computer readable storage medium includes non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims.

What is claimed is:

1. A method, comprising:
   selecting, by a software grid establishment component (GEC) executing on a computer processor, from a plurality of nodes, a set of grid nodes having a media access control port accessible by the software GEC; and
   establishing, by the software GEC executing on the computer processor without user intervention, a resource grid, wherein establishing comprises:
   issuing, via the media access control port, a command to each of the grid nodes in the set of grid nodes to perform a network reboot, wherein the set of grid nodes performs the network reboot using an operating system image provided by the software GEC, and wherein the operating system image comprises an operating system and a grid facilitation agent;
   configuring, using the grid facilitation agent, each grid node in the set of grid nodes to enable that grid node to participate as part of the resource grid, wherein configuring the grid node to enable that grid node to participate as part of the resource grid comprises:
   deploying a grid participation module to the grid facilitation agent operating on the grid node,
   instructing the grid facilitation agent to run the grid participation module on the grid node to enable the grid node to participate as part of the resource grid, wherein the grid participation module corresponding to a grid master comprises instructions for selecting a slave node to process a resource request and instructions for forwarding the resource request to the slave node, and
   wherein the grid participation module corresponding to the slave node comprises instructions for receiving the resource request from the grid master and instructions for processing the resource request,
   deploying an application for processing the resource request to the grid node when the grid node is the slave node, and
   instructing the grid facilitation agent to run the application when the grid node is the slave node;
   establishing the grid master to manage access to resources provided by the set of grid nodes, such that the resource grid formed by the set of grid nodes behaves as a single pool of resources accessible through the grid master;
   configuring the grid master with an identity of each slave node; and
   configuring each slave node with an identity of the grid master.

2. The method of claim 1, wherein the grid master executes the software GEC.

3. The method of claim 1, wherein establishing the grid master comprises:
   establishing at least one of the grid nodes in the set of grid nodes as the grid master.

4. The method of claim 1, wherein the set of grid nodes comprises only a portion of the plurality of grid nodes having a media access control port accessible by the software GEC.

5. An apparatus communicatively coupled to a plurality of nodes, the apparatus comprising:
   a mechanism for selecting from the plurality of nodes, a set of grid nodes having a media access control port accessible by a software GEC; and
   a mechanism for establishing, without user intervention, a resource grid, wherein the mechanism for establishing the resource grid comprises:
   a mechanism for issuing, via the media access control port, a command to each of the grid nodes in the set of grid nodes to perform a network reboot, wherein the set of grid nodes performs the network reboot using an operating system image provided by the software GEC, and wherein the operating system image comprises an operating system and a grid facilitation agent;
   a mechanism for configuring, using the grid facilitation agent, each grid node in the set of grid nodes to enable that grid node to participate as part of the resource grid, wherein the mechanism for configuring the grid node comprises:
   a mechanism for deploying a grid participation module to the grid facilitation agent operating on the grid node, a mechanism for instructing the grid facilitation agent to run the grid participation module on the grid node to enable to grid node to participate as part of the resource grid,
  wherein the grid participation module corresponding to a grid master comprises instructions for selecting a slave node to process a resource request and instructions for forwarding the resource request to the slave node, and
  wherein the grid participation module corresponding to the slave node comprises instructions for receiving the resource request from the grid master and instructions for processing the resource request,
a mechanism for deploying an application for processing the resource request to the grid node when the grid node is the slave node, and
a mechanism for instructing the grid facilitation agent to run the application when the grid node is the slave node;
a mechanism for establishing the grid master to manage access to resources provided by the set of grid nodes, such that the resource grid formed by the set of grid nodes behaves as a single pool of resources accessible through the grid master;
a mechanism for configuring the grid master with an identity of each slave node; and
a mechanism for configuring each slave node with an identity of the grid master.

6. The apparatus of claim 5, wherein the grid master executes the mechanism for establishing the resource grid.

7. The apparatus of claim 5, wherein the mechanism for establishing the grid master comprises:
a mechanism for establishing at least one of the grid nodes in the set of grid nodes as the grid master.

8. The apparatus of claim 5, wherein the set of grid nodes comprises only a portion of the plurality of grid nodes having a media access control port accessible by the software GEC.

9. A computer readable medium, comprising instructions for causing one or more processors to:
select, from a plurality of nodes, a set of grid nodes having a media access control port accessible by a software GEC; and
establish, without user intervention, a resource grid, wherein establish comprises:
  issuing, via the media access control port, a command to each of the grid nodes in the set of grid nodes to perform a network reboot, wherein the set of grid nodes performs the network reboot using an operating system image provided by the software GEC, and wherein the operating system image comprises an operating system and a grid facilitation agent;
  configuring, using the grid facilitation agent, each grid node in the set of grid nodes to enable that grid node to participate as part of the resource grid, wherein the configuring the grid node to enable that grid node to participate as part of the resource grid comprises:
    deploying a grid participation module to the grid facilitation agent operating on the grid node,
    instructing the grid facilitation agent to run the grid participation module on the grid node to enable the grid node to participate as part of the resource grid,
      wherein the grid participation module corresponding to a grid master comprises instructions for selecting a slave node to process a resource request and instructions for forwarding the resource request to the slave node, and
      wherein the grid participation module corresponding to the slave node comprises instructions for receiving the resource request from the grid master and instructions for processing the resource request,
    deploying an application for processing the resource request to the grid node when the grid node is the slave node, and
    instructing the grid facilitation agent to run the application when the grid node is the slave node;
  establishing the grid master to manage access to resources provided by the set of grid nodes, such that the resource grid formed by the set of grid nodes behaves as a single pool of resources accessible through the grid master;
  configuring the grid master with an identity of each slave node; and
  configuring each slave node with an identity of the grid master.

10. The computer readable storage medium of claim 9, wherein the grid master establishes the resource grid.

11. The computer readable storage medium of claim 9, wherein the establishing the grid master comprises:
establish at least one of the grid nodes in the set of grid nodes as the grid master.

12. The computer readable storage medium of claim 9, wherein the set of grid nodes comprises only a portion of the plurality of grid nodes having a media access control port accessible by the software GEC.

* * * * *